3,826,841
Patented July 30, 1974

3,826,841
METHOD FOR EXTERMINATING RODENTS AND RODENTICIDE COMPOSITIONS
Hiroshi Yamamoto, Tokyo, Kengo Koike, Ageo, and Koji Ohgushi and Iwao Tokumitsu, Fukuoka, Japan, assignors to Nippon Kayaku Kabushiki Kaisha, Tokyo, Japan
No Drawing. Filed Sept. 5, 1972, Ser. No. 286,092
Claims priority, application Japan, Sept. 13, 1971, 46/70,388
Int. Cl. A01n 9/12, 9/20
U.S. Cl. 424—323                    4 Claims

ABSTRACT OF THE DISCLOSURE

A rodenticide including as an effective component a compound of the formula (1):

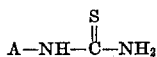   (1)

wherein A represents

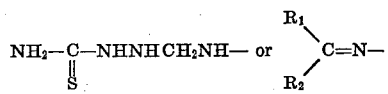

$R_1$ is hydrogen or alkyl of 1 to 9 carbons and $R_2$ is hydrogen, cyano or lower alkyl has been found to have excellent exterminating effects on rodents.

DETAILED DESCRIPTION OF THE INVENTION

The inventors of the present invention have found as a result of an extensive study on novel rodenticides that compounds expressed by the above-mentioned general formula (1) exhibit excellent exterminating effects on rodents. This invention has been completed on the basis of such finding.

Typical examples of the compounds expressed by the general formula (1) used in the present invention are shown in Table 1 below.

TABLE 1

| Number | Compound | Appearance | Melting point °C. |
|---|---|---|---|
| 1 | Formaldehyde thiosemicarbazone | White crystal. | [1] 105–107 |
| 2 | Acetoaldehyde thiosemicarbazone | do | 143–5 |
| 3 | Propionaldehyde thiosemicarbazone | do | 153–4 |
| 4 | Acetone thiosemicarbazone | do | 187–8 |
| 5 | Secondary caproic aldehyde thiosemicarbazon. | do | 80–3 |
| 6 | Capric aldehyde thiosemicarbazone | do | 73–6 |
| 7 | Acetyl cyanide thiosemicarbazone | do | [1] 180–200 |
| 8 | Methylene bis(1-thiosemicarbazide) | do | [1] 173–175 |

[1] Decomposition.

The compound mentioned under No. 8 in Table 1 may be used in the form of an acid addition salt such as a hydrochloride of the compound. In the above table, the compounds Nos. 1 and 8 are novel compounds which have not yet been described in existing literature. In this connection, the methylene bis(1-thiosemicarbazide) can be prepared as a main product and at the same time the formaldehyde thiosemicarbazone as a by-product by reacting thiosemicarbazide with formaldehyde in acetonitrile or an acetic ester (such as methyl acetate, ethyl acetate, propyl acetate or the like). The other compounds in the table can also be prepared by thermally reacting on a water bath thiosemicarbazide with an aldehyde or ketone corresponding to the respective compounds to be obtained in the presence of or in the absence of an alcohol.

The compounds represented by the general formula (1) and employed in the present invention may be used by itself as a rodenticide, but may be employed together with a suitable adjuvant carrier and other auxiliary agents, etc. in a general manner. Examples of useful carriers are starch, kaolin, montmorillonite, diatomaceous earth, sucrose, a liquified material, i.e., an aromatic hydrocarbon such as xylene, chlorobenzene, etc., aliphatic esters or water, and a material which is favored by rodents, i.e., a meat, an extract of meat, a grain such as rice, wheat flour, buckwheat flour or maize flour, a potato, a sweet potato, seeds of a sunflower, fish-meat, fruit, vegetable, etc. The composition of the present invention may be employed as a rodenticide in the form of powder, particles, tablets, pellets, solution, suspension, emulsion and paste or in other forms suitable use, with the aid, if necessary, of an auxiliary agent such as an emulsifier or a dispersing agent. As the emulsifier, non-ionic and anionic emulsifiers, for example, aliphatic esters or phosphoric esters of polyethylene glycol, are preferred. Moreover, calcium sulfate is preferably used as a dispersing agent.

The rodenticide composition of the present invention generally includes the compound expressed by the general formula (1) in an amount of 0.05–95% by weight, preferably 0.5–90%.

For exterminating the rodents using the composition, a usual method, for instance, of putting a bait or water containing therein the rodenticide in an area where the rodents are easy to find, a method of scattering a powdery rodenticide on a passage of the rodents, or the like can be employed.

The rodents mentioned in this specification include Muridae such as rats, squirrels, etc.

The example for preparing the novel compounds under Nos. 1 and 8 of Table 1 are as follows.

PREPARATION EXAMPLE 1

(Preparation of formaldehyde thiosemicarbazone of the compound No. 1)

91 parts by weight (1 mole) of thiosemicarbazide were dissolved in 1000 parts of acetonitrile under stirring, and then 81 parts of 37% of formalin (1 mole) were dropwise introduced into the mixture under reflux with agitation. The resultant mixture was reacted for 2 hours under reflux, and then was cooled with iced water to give a crystal of methylene bis(1-thiocarbazide). The crystal was filtered and washed three times with 50 parts of acetonitrile. The filtrate and the washing liquid were mixed together and re-filtered, and the resultant filtrate was condensed under vacuum at room temperature and dried up. The dried product was then extracted with 500 parts of hot ethanol, and the extracted liquid was cooled with iced water and was then filtered. The filtrate was condensed under vacuum and was dried up to give 23 parts (yield of 22.2%) of a white crystal. The white crystal had a decomposition point of 105–107° C. and the results of elementary analysis is as follows:

|  | Percent | |
|---|---|---|
|  | Calculated | Found |
| C | 23.28 | 23.76 |
| H | 4.89 | 5.17 |
| N | 40.74 | 40.40 |
| S | 31.09 | 30.97 |

PREPARATION EXAMPLE 2

(Preparation of methylene bis(1-thiosemicarbazone) of the compound No. 8

137 parts of thiosemicarbazide and 1500 parts of acetonitrile were mixed with agitation and then 91 parts (about 1.5 times of the theoretical amount) of 37% formalin were dropped into the mixture. The resultant mixture was reacted for 2 hours under reflux. Thereafter, the reacted mixture was cooled to 50° C. and the resultant precipitated crystal was filtered. The thus obtained crystal was washed eight times with 50 parts of acetonitrile and was dried to yield 88.6 parts (91.5% of the theoretical amount) of a white crystal. The white crystal had a decomposition point of 173–175° C. and the results of elementary analysis is as follows:

C: 18.501 (Calc. 18.54%)
H: 5.14% (Calc. 5.19%)
N: 43.26% (Calc. 43.26%)
S: 32.78% (Calc. 33.01%)

The acid salt of the above-mentioned compound can be obtained by adding an acid such as hydrochloric acid, sulfuric acid, etc., by the use of a usual method. Moreover, a small amount of formaldehyde thiosemicarbazone was collected from the filtrate.

The effects of the compounds of the present invention will be illustrated in the following experimental examples.

EXPERIMENTAL EXAMPLE 1

Test animal: Norway Rat (*Rattus Norvegicus*)

A 3% starch solution was prepared and boiled, and then the boiled solution was allowed to cool. A given amount of each of the compounds of Table 2 containing effective components of the present invention was suspended in the cooled solution. 2 ml. of the suspension was dosed by means of a stomach tube through a mouth of each test rat of which weight had been previously measured. Thereafter, the dosed rats were reared and the survival and death of the test rats were observed for five days after dosing. The test results are shown in Table 2.

TABLE 2

| Compound number | Amount compound dosed mg./kg. of test rat | Test rat Weight (g.) | Sex | Survival or death | Lethal time (min.) |
| --- | --- | --- | --- | --- | --- |
| 1 | 170 | 100 | Female | Dead | 150 |
|   | 50  | 150 | do     | do   | 170 |
| 2 | 100 | 90  | Male   | do   | 150 |
|   | 50  | 300 | do     | do   | 125 |
| 3 | 100 | 110 | Female | do   | 150 |
|   | 50  | 160 | Male   | do   | 145 |
| 4 | 100 | 150 | Female | do   | 180 |
|   | 50  | 160 | do     | do   | 180 |
| 5 | 100 | 155 | do     | do   | (¹) |
|   | 50  | 115 | do     | Survived | — |
| 6 | 100 | 170 | do     | Dead | (¹) |
|   | 50  | 145 | do     | do   | (¹) |
| 7 | 100 | 140 | do     | do   | 160 |
|   | 50  | 160 | do     | do   | 180 |

¹ Within one day.

EXPERIMENTAL EXAMPLE 2

(Fatal effects on Norway rats (*Rattus Norvegicus*) by means of a natural-feeding method)

Test rats were individually put in a test cage (20 cm. x 25 cm. x 35 cm.). 10 g. of a bait which was prepared by the method of Example 9 (hereinafter described) was introduced in a tall skirted dish (schale), which was placed in the cage. A relationship of the amount fed and fatal effects of the bait was observed. The test results are shown in Table 3.

EXPERIMENTAL EXAMPLE 3

(Acute Virulence on Norway rats (*Rattus Norvegicus*), Roof rat (*Rattus raitus*), Japanese field rat (*Murotus montebelli*), according to direct injection on the stomach)

The compound of No. 8 was suspended in a 3% starch solution (which was prepared in a manner similar to the Experimental Example 1). 2 ml. of the suspension was injected in each of test rats by means of a stomach tube and the fatal effects on the rats were observed. The test results are given in Table 4.

TABLE 4

| Kind of rats | Test individual Weight | Sex | Amount of compound injected (mg./kg.) | Lethal time |
| --- | --- | --- | --- | --- |
| Norway rat | 260 | Male | 192 | 124 (min.). |
|            | 255 | do   | 147 | 92 (min.).  |
|            | 190 | do   | 139 | 169 (min.). |
|            | 180 | do   | 66  | 127 (min.). |
| Roof rat   | 140 | do   | 800 | 137 (min.). |
|            | 130 | do   | 400 | 166 (min.). |
|            | 125 | do   | 200 | 194 (min.). |
|            | 145 | do   | 100 | 8 (hours).  |
| Japanese field rat | 35 | Female | 100 | 170 (min.). |
|            | 32  | do   | 50  | 30 (hours). |

EXPERIMENTAL EXAMPLE 4

(Experiment of effects on Norway rats resulted from ingestion with an interval)

A bait containing therein 0.1% by weight of the compound No. 8 prepared by Example 9 was fed to Norway rats over 2 days. Non-poisonous bait was then given to the survived individuals over 5 days, after which a bait containing therein 1% by weight of effective components of the present invention was re-fed to the survived rats. The relationship between the amount re-fed and the fatal

TABLE 3

| Compound number | Test rat Weight (g.) | Sex | Bait Concentration, percent | Amount dosed (g.) | Amount fed (g.) | Amount ingested of compound per kg. of rat (mg./kg.) | Survival or death | Lethal time |
| --- | --- | --- | --- | --- | --- | --- | --- | --- |
| 8 | 240 | Male   | 1.0 | 10.0 | 1.5 | 62.5  | Dead | Within one day. |
|   | 190 | do     | 1.0 | 10.0 | 1.0 | 52.7  | do   | Do. |
|   | 220 | do     | 1.0 | 10.0 | 1.5 | 68.2  | do   | Do. |
|   | 235 | do     | 1.0 | 10.0 | 0.5 | 21.3  | Survived. | |
|   | 155 | Female | 1.0 | 10.0 | 1.5 | 96.7  | Dead | Do. |
|   | 265 | do     | 1.0 | 10.0 | 1.2 | 45.2  | do   | Do. |
|   | 255 | Male   | 2.0 | 5.0  | 1.3 | 102   | do   | Do. |
|   | 145 | do     | 2.0 | 5.0  | 2.1 | 290   | do   | Do. |
|   | 225 | Female | 2.0 | 5.0  | 1.5 | 133   | do   | Do. |
|   | 185 | do     | 2.0 | 5.0  | 2.0 | 216   | do   | Do. |
|   | 145 | Male   | 0.5 | 10.0 | 1.6 | 55.2  | do   | Do. |
|   | 135 | do     | 0.5 | 10.0 | 1.6 | 59.2  | do   | Do. |
|   | 130 | do     | 0.5 | 10.0 | 1.1 | 42.3  | Survived. | |
|   | 125 | Female | 0.5 | 10.0 | 2.3 | 91.9  | Dead | Do. |
| Hydrochloride of Compound No. 8. | 125 | Male | 1.0 | 10.0 | 1.0 | 80.5 | do | Do. | effects of the composition was observed. The test results are given in Table 5.

TABLE 5

| Test rat | | Amount of compound re-ingested mg./kg. | Lethal days |
|---|---|---|---|
| Weight, grams | Sex | | |
| 165 | Male | 218 | Within one day. |
| 160 | do | 169 | Do. |
| 150 | do | 173 | Do. |
| 160 | Female | 169 | Do. |
| 140 | do | 93 | Do. |
| 120 | do | 167 | Do. |

EXPERIMENTAL EXAMPLE 5

Two wire cages each having a dimension of 90 cm. (width) x 90 cm. (length) x 60 cm. (height) and having a gateway 10 cm. wide and 10 cm. long were connected with a rectangular hollow tube having a dimension of 20 cm. (width) x 20 cm. (height) x 30 cm. (length).

A nest was placed in one cage and a non-poisonous bait in the other. A vat was set on the floor of the tube in which vat a powdered agent of talc containing 10% by weight of the compound No. 8 was scattered in an amount of 15 g./500 cm.$^2$. Then, five female Norway rats having an average weight of 157 g. were placed in the cages and were compelled to directly tough the scattered powdery agent whenever they pass through the tube to observe the fatal effects of the scatered agent, with the result that all of the five rats died one day after.

The present invention will be illustrated in the following examples. The mixed ratio of the effective components and the kinds of the additives may be varied over a wide range. Percentage used in examples are percentage by weight unless otherwise specified.

EXAMPLE 1

|  | Percent |
|---|---|
| Compound No. 1 | 10 |
| Talc | 90 |

The above components were mixed together to give a powdered agent.

EXAMPLE 2

|  | Percent |
|---|---|
| Compound No. 2 | 10 |
| Starch | 90 |

The above components were mixed and 10 parts of the mixture were covered with 100 parts of a material such as a sweet potato, a potato, bread, fried beancurd or the like to give a bait.

EXAMPLE 3

|  | Percent |
|---|---|
| Compound No. 3 | 1 |
| Maize flour | 10 |
| Buckwheat flour | 10 |
| Wheat flour | 65 |
| Rice bran | 10 |
| Fish meat | 4 |

To 100 parts of the above components, were added 20 parts of water and the mixture was kneaded and moulded into a cylindrical form having a diameter of 3 cm. and a length of 5 cm. and the mould thus obtained was dried to give a bait.

EXAMPLE 4

|  | Percent |
|---|---|
| Compound No. 4 | 10 |
| Starch | 45 |
| Theriac | 25 |
| Extract of meat | 5 |
| Sesami oil | 15 |

10 parts of the above composition were covered with 100 parts of a material such as a sweet potato, a potato, bread, fried beancurd or the like to prepare a bait.

EXAMPLE 5

|  | Percent |
|---|---|
| Compound No. 5 | 1 |
| Water-soluble starch | 20.9 |
| Sugar | 5 |
| Sesami oil | 5 |
| Water | 20 |

The above components were mixed together to give a bait.

EXAMPLE 6

|  | Percent |
|---|---|
| Compound No. 8 | 10 |
| Talc | 90 |

The above components were mixed together to give a powdery rodenticidal agent. The powdery agent was scattered for exterminating rodents.

EXAMPLE 7

|  | Percent |
|---|---|
| Salt of the compound No. 8 and hydrochloric acid | 10 |
| Starch | 90 |

The above components were mixed together and 10 parts of the mixture were covered with 100 parts of a material such as a sweet potato, a potato, bread, fried beancurd to give a bait.

EXAMPLE 8

|  | Percent |
|---|---|
| Compound No. 8 | 1 |
| Maize flour | 10 |
| Buckwheat flour | 10 |
| Wheat flour | 65 |
| Rice bran | 10 |
| Fish meat | 4 |

The above components were mixed together and 20 parts of water was added to 100 parts of the mixture and the resultant mixture was kneaded and was moulded into a cylindrical form having a diameter of 3 cm. and a length of 5 cm. and was dried to give a bait. In this example, a salt of the compound No. 8 and hydrochloric acid may be replaced by the compound No. 8 to obtain a similar bait.

EXAMPLE 9

|  | Percent |
|---|---|
| Compound No. 8 | 10 |
| Starch | 45 |
| Theriac | 25 |
| Extract of meat | 5 |
| Sesami oil | 15 |

The above components were mixed together and 10 parts of the mixture were covered with 100 parts of a material such as a sweet potato, a potato, bread, fried beancurd or the like to give a bait.

EXAMPLE 10

|  | Percent |
|---|---|
| Compound No. 8 | 1 |
| Water-soluble starch | 20.9 |
| Sugar | 5 |
| Sodium benzoate | 0.1 |
| Water | 73 |

The above components were mixed together to give a water-soluble bait.

EXAMPLE 11

|  | Percent |
|---|---|
| Compound No. 8 | 1 |
| Wheat flour | 69 |
| Sugar | 5 |
| Sesami oil | 5 |
| Water | 20 |

The above composition was kneaded and moulded into dumplings of 0.5 g. apiece to give a bait.

EXAMPLE 12

The powder of the compound No. 8 was scattered by itself over a passage of rats.

EXAMPLE 13

The powder of the compound No. 8 was covered with raw potatoes cut into 3 cm. square to give a bait containing 1% of the compound.

EXAMPLE 14

After being immersed into a 10% sugar solution, wheat granules were covered with compound No. 2 to give a bait.

EXAMPLE 15

20 parts of water were added to 100 parts of maize flour and the mixture was kneaded. 10 parts of compound No. 3 were further added to and mixed with the kneaded mixture to give a bait.

EXAMPLE 16

1 part of the powder of compound No. 6 were suspended in 100 parts of a food oil to give a bait or a scattering solution.

EXAMPLE 17

The powder of compound No. 8 was scattered on bread impregnated with a 10% sugar solution to give a bait.

What is claimed is:

1. A method for exterminating rodents belonging to the genus Muridae by applying to said rodents a rodenticidally effective amount of a compound of the formula

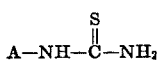

wherein A represents

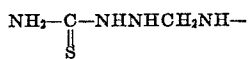

or

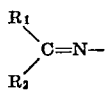

in which $R_1$ is hydrogen or alkyl of 1 to 9 carbons and $R_2$ is hydrogen, cyano or lower alkyl.

2. The method of claim 1, wherein said compound is methylene bis (1-thiosemicarbazide).

3. A rodenticide composition comprising 0.5-90% by weight of a compound of the formula

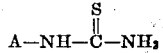

wherein A represents

or

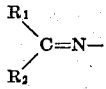

in which $R_1$ represents hydrogen or alkyl of 1 to 9 carbons and $R_2$ represents hydrogen, cyano or lower alkyl, and 99.5-10% by weight of a suitable adjuvant.

4. The composition of claim 3, wherein said compound is methylene bis (1-thiosemicarbazide) or an acid addition salt thereof.

References Cited

UNITED STATES PATENTS

| | | | |
|---|---|---|---|
| 2,408,307 | 9/1946 | Gertler et al. | 424—323 |
| 2,582,940 | 1/1952 | Waletzky et al. | 424—323 |
| 2,710,243 | 6/1955 | Swimmer | 260—552 SC |

FOREIGN PATENTS

| | | | |
|---|---|---|---|
| 679,894 | 9/1952 | Great Britain | 260—552 SC |
| 247,378 | 12/1960 | Australia | 260—552 SC |

OTHER REFERENCES

Chem. Abst. 69, 26285w (1968), Toxic action of rodenticides, Kusano, Tyuzi.

ALBERT T. MEYERS, Primary Examiner

D. W. ROBINSON, Assistant Examiner

U.S. Cl. X.R.

260—552 SC; 424—304